(12) United States Patent
Waeben et al.

(10) Patent No.: US 9,585,811 B2
(45) Date of Patent: Mar. 7, 2017

(54) METHOD FOR PRODUCING A CRIMP CAP, CRIMP CAP AND CONTAINER

(75) Inventors: Reinhard Louis Jozef Waeben, Hasselt (BE); Ralf Dittmer, Straubenhardt (DE); Ronny Prosper Elisabeth Vrijens, Vliermaalroot (BE)

(73) Assignee: Datwyler Pharma Packaging Belgium NV, Alken (BE)

(*) Notice: Subject to any disclaimer, the term of this patent is extended or adjusted under 35 U.S.C. 154(b) by 11 days.

(21) Appl. No.: 14/350,395

(22) PCT Filed: Oct. 11, 2011

(86) PCT No.: PCT/EP2011/067734
§ 371 (c)(1),
(2), (4) Date: Apr. 8, 2014

(87) PCT Pub. No.: WO2013/053384
PCT Pub. Date: Apr. 18, 2013

(65) Prior Publication Data
US 2014/0251942 A1    Sep. 11, 2014

(51) Int. Cl.
*B65D 41/14* (2006.01)
*B65D 41/10* (2006.01)
(Continued)

(52) U.S. Cl.
CPC ........... *A61J 1/1412* (2013.01); *A61J 1/1425* (2015.05); *B21D 51/44* (2013.01);
(Continued)

(58) Field of Classification Search
CPC  A61J 1/1412; A61J 2/1406; A61J 1/18; A61J 1/1425; A61J 1/1431; Y10T 156/1002; B21D 51/44; B65D 41/10; B29D 99/0096
(Continued)

(56) References Cited

U.S. PATENT DOCUMENTS

| 4,844,267 A | 7/1989 | Von Schuckmann |
| 5,405,031 A | 4/1995 | Derksen |

(Continued)

FOREIGN PATENT DOCUMENTS

| CA | 2 150 009 A1 | 6/1994 |
| DE | 42 40 373 A1 | 6/1994 |

(Continued)

OTHER PUBLICATIONS

International Search Report of PCT/EP2011/067734, mailed Jun. 29, 2012.

*Primary Examiner* — J. Gregory Pickett
*Assistant Examiner* — Niki M Eloshway
(74) *Attorney, Agent, or Firm* — Collard & Roe, P.C.

(57) ABSTRACT

The invention relates firstly to a method for producing a crimp cap for a container for receiving a pharmaceutical substance, in particular an ampoule, wherein the crimp cap has a metal foil layer, which is covered over at least on the outside with a layer of plastic forming a covering of the foil layer. In order to provide an advantageous method for producing a crimp cap from a metal foil layer with a layer of plastic forming a covering of the foil layer, while avoiding the risk of particle formation as much as possible, it is proposed that a material strip M having an already plastic-covered foil layer is formed into the crimp cap by punching out and deep drawing. The invention also relates to a crimp cap for a container for receiving a pharmaceutical substance, and also to a container with a pharmaceutical substance.

3 Claims, 3 Drawing Sheets

(51) Int. Cl.
- *A61J 1/14* (2006.01)
- *B21D 51/44* (2006.01)
- *B29D 99/00* (2010.01)
- *A61J 1/18* (2006.01)

(52) U.S. Cl.
CPC ......... *B29D 99/0096* (2013.01); *B65D 41/10* (2013.01); *A61J 1/1406* (2013.01); *A61J 1/1431* (2015.05); *A61J 1/18* (2013.01); *Y10T 156/1002* (2015.01)

(58) Field of Classification Search
USPC .............................. 215/324, 326, 325, 327
See application file for complete search history.

(56) References Cited

U.S. PATENT DOCUMENTS

| | | | |
|---|---|---|---|
| 5,588,547 | A | 12/1996 | Derksen |
| 5,682,663 | A | 11/1997 | Derksen |
| 5,794,804 | A | 8/1998 | Sloan et al. |
| 2007/0138125 | A1* | 6/2007 | Granger ........................ 215/312 |
| 2008/0000870 | A1* | 1/2008 | Lopez Alvarez et al. .... 215/355 |
| 2008/0272086 | A1* | 11/2008 | Granger et al. ............. 215/354 |
| 2010/0264109 | A1* | 10/2010 | Garcia Pedraza et al. ... 215/328 |
| 2014/0251942 | A1* | 9/2014 | Waeben et al. ............... 215/324 |

FOREIGN PATENT DOCUMENTS

| | | |
|---|---|---|
| DE | 196 00 746 A1 | 7/1997 |
| DE | 10 2010 038 031 A1 | 4/2012 |
| EP | 0 120 353 A2 | 10/1984 |
| EP | 0 291 658 A1 | 11/1988 |
| EP | 0 312 308 A1 | 4/1989 |
| EP | 0 598 179 A1 | 5/1994 |
| EP | 0 663 347 A2 | 7/1995 |

\* cited by examiner

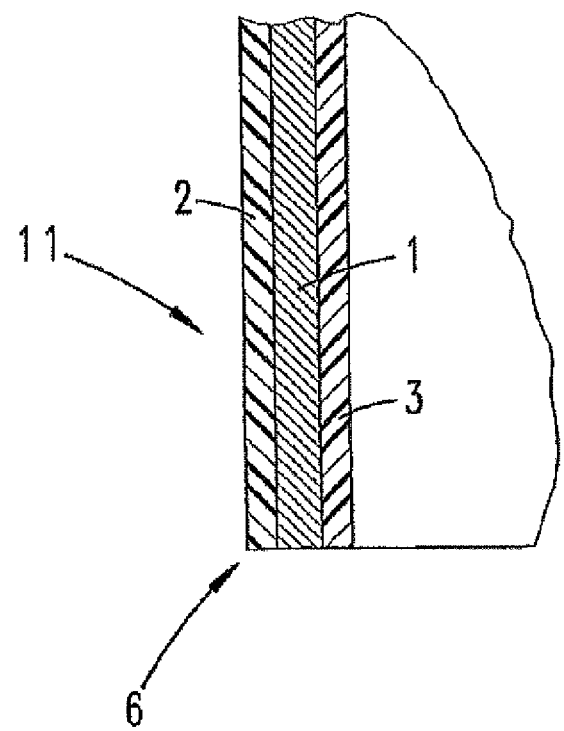
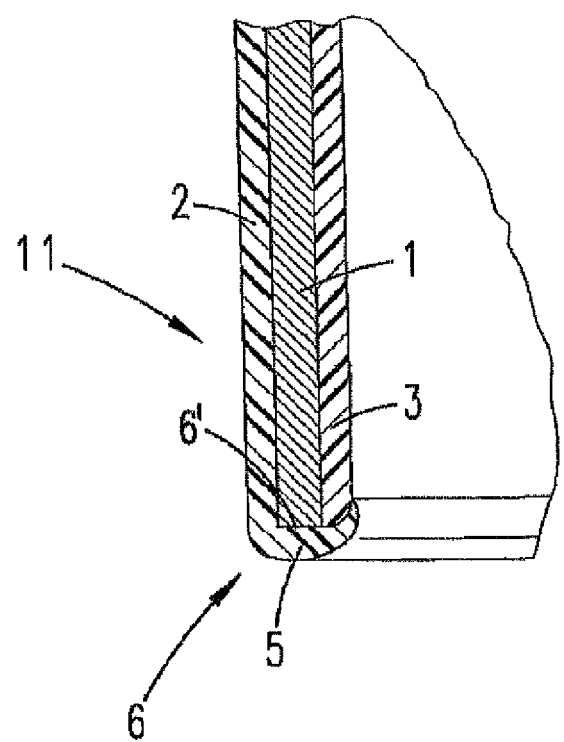

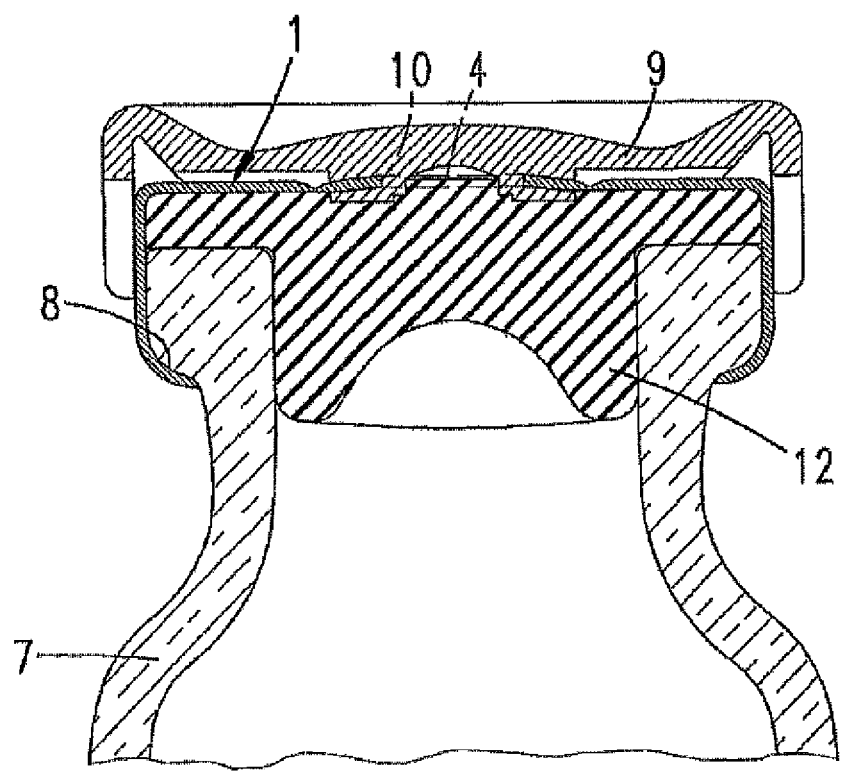

METHOD FOR PRODUCING A CRIMP CAP, CRIMP CAP AND CONTAINER

CROSS REFERENCE TO RELATED APPLICATIONS

This application is the National Stage of PCT/EP2011/067734 filed on Oct. 11, 2011, the disclosure of which is incorporated by reference. The international application under PCT article 21(2) was not published in English.

The invention firstly relates to a method for producing a crimp cap.

Crimp caps of this type have already been disclosed in various respects. Reference is made, for example, to EP 291 658 A1, EP 663 347 A2 and EP 598 179 A1. From EP 663 347 A2, it is already known to form an aluminum crimp cap having an inner cap formed of a plastics film portion. With respect to the production of a crimp cap, in general by a stamp forming/bend forming process, reference is made to this document. In addition, reference should also be made to U.S. Pat. No. 5,794,804 A1. From the last-named printed publication, it is known, for the avoidance of particles, to coat a metal foil layer, consisting of aluminum, with a polymeric material after the metal foil layer has been formed into the cap shape.

A crimp cap in which a plastics coating or a lacquer coat is alternatively provided on a metallic foil layer is known from EP 120 353 A2. From EP 312 308 A1, a plastics coated metal plate is known. DE 42 40 373 A1 describes a production of tear-tab lids made of a metal plate. The metal plate can here have a surface protection coat in the form of a thermoplastic plastics film. U.S. Pat. No. 5,794,804 A discloses a closing cap for pharmaceutical containers, having a metal layer, which metal layer has a complete plastics casing.

Based on the cited prior art, the invention concerns itself with the object of defining an advantageous method for producing a crimp cap from a metallic foil layer having a plastics layer that forms a covering of the foil layer, while as far as possible avoiding the risk of particle formation.

This object is achieved with a method as described herein, the focal point of which is that a lacquer coat is provided between the plastics layer and the foil layer, and that the plastics layer is designed to be transparent to enable determination of the color appearance of the crimp cap, or the plastics layer is of transparent configuration and is connected to the metallic foil layer with an adhesive that creates a color effect and is visible through the plastics layer. A material strip having an already plastics coated foil layer as the starting material is formed into the crimp cap by stamping-out and deep-drawing.

The invention takes the path of using a starting material, which is already present as the coated metallic foil layer, to produce the crimp cap. The coating with the plastics layer is already given with the commencement of the stamping-out and forming into the crimp cap. In return, the invention accepts that, at least initially, a cut edge of the crimp cap is not covered over with the plastics layer.

On the one hand, a very rational production method is herewith defined. Material strips which are already commercially available, even if not previously used for this purpose, and which have a metallic foil layer with appropriate covering, are able to be used. On the other hand, it has been shown that, with regard to the special requirements demanded of a crimp cap for a vessel containing pharmaceutical substances, such as, in particular, an ampoule filled with, for example, pharmaceutical powder or pharmaceutical liquid, a very strong reduction in the risk of a separation of particles, which might otherwise arise during handling of a crimp cap, is achieved. Said separation risk is here given in practically all stations of the handling operation: thus, in particular in the production, transport, washing, sterilization and/or application of the crimp cap to an appropriate vessel.

The subject of the invention is also a crimp cap.

With regard to the prior art already cited in the introduction, the invention concerns itself, in this respect also, with the object of providing a further advantageous crimp cap.

This object is achieved with respect to the crimp cap in that a lacquer coat is disposed between the plastics layer and the foil layer, and in that the plastics layer is designed to be transparent to enable determination of the color appearance of the crimp cap, or in that the plastics layer is of transparent configuration and is connected to the metallic foil layer with an adhesive that creates a color effect and is visible through the plastics layer.

The subject of the invention is further a container that includes a crimp cap as described herein.

In this respect also, reference is made to the prior art cited in the introduction. The defined object is obtained to the point of providing a container of this type having an advantageously configured and applied crimp cap.

To this end, in one embodiment of a container with a crimp cap, in the crimp cap a cut edge of the foil layer of the crimp cap marginal edge (6) is covered over by a portion of the plastics layer (2, 3), which portion, in this region, is stretched in comparison to the rest of the plastics layer (2, 3) by drawing and is then drawn over the marginal edge and fastened there.

It is preferred, as also already discussed in principle, that the stamping-out and deep-drawing is conducted in a combined single operation.

It is additionally preferred that the stamping tool is configured with regard to the production such that, at the stamped margin, a tensile elongation of the plastics layer, which leads to the protrusion of the plastics layer over the stamped margin of the foil layer, occurs. In this respect, it has been recognized that this tensile elongation of the existing plastics layer can be achieved by means of a comparatively blunt setting of the stamping tool. That sharpness of the stamping tool which is actually—minimally—necessary to attain this effect can be determined empirically. It can also be different, depending on the actual configuration of the foil layer or plastics layer.

Following the stamping-out and deep-drawing of the stamped-out foil portion into the crimp cap, which, as described, preferably take place simultaneously, a cap part of U-shaped cross section is obtained, the margin of which cap part has either a marginal edge having a plastics layer and a foil layer pared practically at the same height, or a marginal edge having a plastics layer which, elongated on the outside, reaches over the foil layer. The elongation can here be comparatively small. It measures preferably in the order of magnitude of the thickness of the metallic foil layer. This thickness can amount, for example, to 0.05-0.5 mm.

As a result of this drawing of the plastics layer beyond said margin of the foil layer, a stretching of the plastics layer relative to said marginal region is obtained. This thus stretched region of the plastics layer can then in a further step be bent over onto the cut edge of the foil layer and be bonded thereto, or, for example, crumpled.

As a result of this last-named process, a crimp cap having a covering of the cut edge of the foil layer by the stretched plastic is obtained. The stretching is obtained in comparison to the plastics layer in a region distant from marginal edge.

Distant is in this case a region which is 1 mm or more, for example up to 5 mm, distanced from the marginal edge.

Subsequently, a lacquer coat can be disposed between the plastics layer and the metallic foil layer, in particular to lend to the crimp cap a desired coloring, pattern or the like. The plastics layer is, at least in such a case, preferably transparent or only slightly tinted. The color appearance can then be substantially determined by the lacquering. The lacquer coat is preferably constituted by an epoxy resin based lacquer. The lacquer coat can have a thickness of, for example, 2-5 µm.

It can also be provided that the plastics layer is of transparent configuration and is connected to the metallic foil layer with an adhesive that creates a color effect and is visible through the plastics layer. In this embodiment, a desired color effect can be attained solely by the use of an adhesive which is tinted in this regard. The lacquer coat can then be omitted. It also only remains necessary to apply just a transparent plastics film, for example, as the plastics layer. This embodiment is preferably realized on the top side or inner face of the crimp cap. However, it can also additionally be realized on the bottom side or inner side.

Said plastics layer can have a same thickness as the metallic foil layer, but it can also be still thicker, for instance up to 2 to 3 times the thickness of the metallic foil layer, or up to 0.8 mm thickness.

The plastics layer can also be provided on both sides of the foil layer.

With respect to the plastics layer, this can be constituted by a standard PP or PE film, which has previously been applied to the metallic foil layer, in particular, with the interposition of a coat of contact adhesive, is bonded to the metallic layer.

With respect to the metallic foil layer, this is preferably constituted by an aluminum foil layer.

The ranges or value ranges which are quoted above and below include, with respect to the disclosure, also all intermediate values, in particular in 1/10 steps of the respective dimension, where appropriate, therefore, even dimensionless, i.e., for example, 1/10 µm or 1/10 mm, etc., on the one hand for the downward and/or upward confinement of said range limits, alternatively or additionally, however, also with regard to the disclosure of one or more singular values from a respective range.

The invention is further explained below with reference to the appended drawing, which represents, however, merely an illustrative embodiment, wherein:

FIG. 4 shows an enlarged detail from FIG. 3;

FIG. 5 shows a further enlarged detail of a subject according to FIG. 3, in an alternative embodiment;

FIG. 6 shows an ampoule, provided with the crimp cap, in basic representation.

Figure 1:
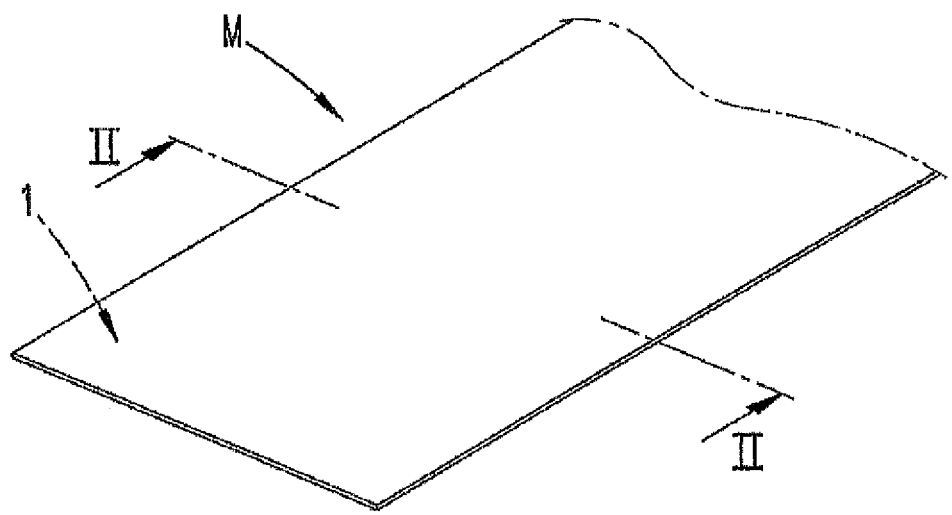
FIG. 1 shows a portion of a coated metallic foil layer.
Figure 2:
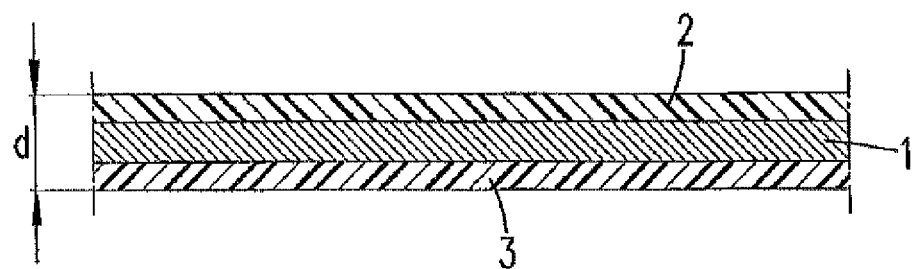
FIG. 2 shows a cross section through the subject according to FIG. 1, sectioned along the line II-II.

A material strip M, having a metallic film layer 1 which, see also FIG. 2, is coated on the top and bottom sides with a plastics layer 2, 3, is firstly represented and described. The coating is effected by an extruded plastics layer 2, 3 (plastics film), which is preferably connected to the metallic foil layer 1 by means of a coat of adhesive (not represented). Alternatively, a blow-molded or directly extruded-on foil, for example, can be used. The material strip M is formed into a crimp cap according to FIG. 3 in a combined stamping-out and forming process (not specifically represented). An opening 4 is hereupon also stamped out, preferably centrally, in which opening, in the state ultimately applied on an ampoule 7 (as represented, for instance, in FIG. 6), a plastics lid part 9 can be accommodated. The metallic foil layer 1 is constituted in the illustrative embodiment by an aluminum foil layer.

Figure 3:
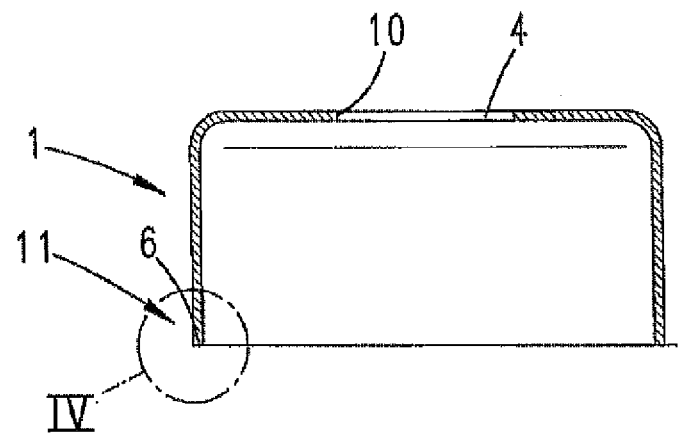
FIG. 3 shows a metallic foil layer formed into a crimp cap.

In FIGS. 4 and 5, different configurations of the marginal edge 6 of the crimp cap 1 according to FIG. 3 are represented. A same configuration can also be obtained with respect to the opening marginal edge 10 of the opening 4. In order to achieve the projection of the plastics layer 2 on the marginal edge 10 of the opening, it can also be advisable to bend the relevant marginal region of the crimp cap 1 downward, into a roughly parallel alignment to the marginal edge 6. A length of the downwardly bent region can here be relatively small, for example can correspond to 0.5-10 times a total thickness d of the foil layer 1.

The statements relating to the stretching of the plastics layer 2 or 3 are likewise pertinent in relation to the opening marginal edge 10.

Said total thickness d of the foil layer 1 with the plastics layer 2 and/or 3 can measure, for example, 50-500 µm.

The representation of FIG. 4 reveals a cut edge, in which the two plastics layers 2, 3, as well as the foil layer 1, have at roughly the same height a cut edge running at right angles to the vertical extent of the crimp cap margin 11, which is here shown in enlarged representation. In the representation of FIG. 5, the outer plastics layer 2 is elongated by stretching in the course of the stamping process such that an overlap portion 5 has been obtained, which overlap portion is lapped over the end face 6' of the foil layer 1 and, in the illustrative embodiment, is connected, for example bonded or welded, to the inner plastics layer 3. Thus, a full coverage of the front edge 6' of the metallic foil layer 1 is also achieved.

In FIG. 6 is represented the upper region of an ampoule 7, in the mouth of which is firstly inserted a stopper 12, and, furthermore, the stopper 12 is reached over by a crimp cap 1 in one of the previously described embodiments. Specifically, the lower crimp cap margin 8, in the course of the application of the crimp cap 1 to the ampoule 7, is once again pressed by a pressing tool into contact against the ampoule 7, reaching under an outer ampoule mouth region 8. In the opening 4 of the crimp cap 1 is anchored a plastics lid part 9, as is known specifically from EP 291 658 A1.

REFERENCE SYMBOL LIST 1 foil layer
2 plastics layer
3 plastics layer
4 opening
5 overlap portion
6 front edge
6' end face
7 ampoule
8 ampoule mouth margin, crimp cap margin
9 plastics lid part
10 opening marginal edge
11 crimp cap margin
12 stopper
d total thickness (of the foil layer 1)
M material strip

The invention claimed is:

1. A crimp cap for a container-for receiving a pharmaceutical substance, which crimp cap is covered over with a metallic foil layer and, at least on the outside, with a plastics layer that forms a covering of the foil layer, the metallic layer having no scoring beneath the covering formed by the plastics layer, wherein, in addition, a crimp cap marginal edge is formed,
wherein the metallic foil layer has a cut edge at the crimp cap marginal edge and the cut edge is covered over by a portion of the plastics layer stretched in comparison to the rest of the plastics layer and fastened at the crimp cap marginal edge, and
wherein
a lacquer coat is disposed between the plastics layer and the foil layer, and the plastics layer is designed to be transparent to enable determination of the color appearance of the crimp cap, or
the plastics layer is of transparent configuration and is connected to the metallic foil layer with an adhesive that creates color effect and is visible through the plastics layer, and
wherein the plastics layer on the outside of the metallic foil layer is a first plastics layer,
wherein the inside of the metallic foil layer is covered over by a second plastics layer, and
wherein the portion of the first plastics layer that is stretched is fastened to the second plastics layer at the crimp cap marginal edge.

2. A container containing a pharmaceutical substance, wherein the container is closed off with a crimp cap, and the crimp cap has a metallic foil layer, which, at least on the outside, is covered over with a plastics layer that forms a covering of the foil layer, the metallic layer having no scoring beneath the covering formed by the plastics layer, wherein, in addition, a crimp cap marginal edge is formed,
wherein the metallic foil layer has a cut edge at the crimp cap marginal edge, the cut edge being covered over by a portion of the plastics layer stretched in comparison to the rest of the plastics layer and fastened at the crimp cap marginal edge, and
wherein
a lacquer coat is disposed between the plastics layer and the foil layer, and the plastics layer is designed to be transparent to enable determination of the color appearance of the crimp cap, or
the plastics layer is of transparent configuration and is connected to the metallic foil layer with an adhesive that creates color effect and is visible through the plastics layer, and
wherein the inside of the metallic foil layer is covered over by a second plastics layer, and
wherein the portion of the first plastics layer that is stretched is fastened to the second plastics layer at the crimp cap marginal edge.

3. A crimp cap for a container for receiving a pharmaceutical substance, which crimp cap is covered over with a metallic foil layer and, at least on the outside, with a plastics layer that forms a covering of the foil layer, the metallic layer having no scoring beneath the covering formed by the plastics layer, wherein, in addition, a crimp cap marginal edge is formed,
wherein
the crimp cap marginal edge has a cut edge which passes through both the foil layer and the plastics layer such that the metallic foil layer at the cut edge is not covered by the plastics layer, and
wherein
a lacquer coat is disposed between the plastics layer and the foil layer, and the plastics layer is designed to be transparent to enable determination of the color appearance of the crimp cap, or
the plastics layer is of transparent configuration and is connected to the metallic foil layer with an adhesive that creates color effect and is visible through the plastics layer.

\* \* \* \* \*